(No Model.)

C. A. PRATT.
TIRE FOR VEHICLE WHEELS.

No. 569,566. Patented Oct. 13, 1896.

WITNESSES.
Matthew M. Blunt.
S. Brainard.

INVENTOR.
By C. A. Pratt.
Arthur W. Crossley.
ATT'Y.

UNITED STATES PATENT OFFICE.

CHARLES A. PRATT, OF CLINTON, MASSACHUSETTS.

TIRE FOR VEHICLE-WHEELS.

SPECIFICATION forming part of Letters Patent No. 569,566, dated October 13, 1896.

Application filed August 12, 1895. Serial No. 559,036. (No model.)

*To all whom it may concern:*

Be it known that I, CHARLES A. PRATT, of Clinton, in the county of Worcester and State of Massachusetts, have invented certain new and useful Improvements in Tires for Vehicle-Wheels, of which the following is a specification.

This invention has relation to yielding tires for bicycles and similar vehicles, and has for its object the provision of such improvements as will secure substantially all the advantages of a pneumatic tire as to lightness in weight and perfectness of action, and the insurance against absolute "shipwreck" possessed by the "cushioned" tire.

The only material objection to the so-called "pneumatic" tire for bicycle purposes is its liability to puncture, escape of the air, and collapse, causing shipwreck and rendering not only the tire but the machine entirely useless.

By my improvements I provide a tire which subserves fully the purposes of the pneumatic tire, and has the additional advantage of being protected against utter collapse, so that in case of a puncture occurring, so as to release the air in the tire, it will still be stayed, so as to avoid shipwreck, but to be still useful to an extent that will permit the user to reach his destination on the wheel.

To these ends the invention consists of a tire for vehicle-wheels consisting of a hollow air-tight tube or body part composed of cellular or sponge rubber having a core composed of granular cork or other light equivalent material having communicating air spaces or interstices between its component particles, and means for forcing air into the interstices or open spaces in the core to inflate the tube to an extent beyond the natural, and a substantially inelastic inclosing sheath combined with a valved nipple to inflate with compressed air the said spaces in the interior, all as I will now proceed to describe and claim.

Reference is to be had to the annexed drawings, and to the letters marked thereon, forming a part of this specification, the same letters designating the same parts or features, as the case may be, wherever they occur.

Figure 1:
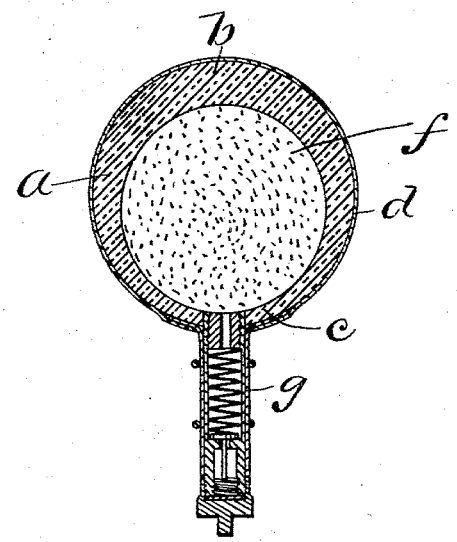
Figure 2:
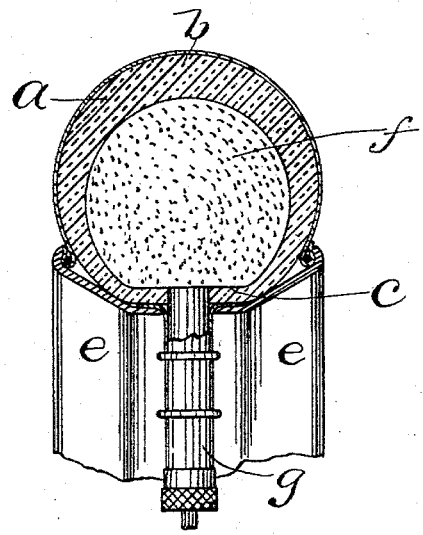

Of the drawings, Figure 1 is a cross-sectional view through a tire constructed in accordance with my invention, the section being struck upon a line running through the air-inflating devices. Fig. 2 is a view similar to that portrayed in Fig. 1, but showing a slightly-different form of parts.

In the drawings, $a$ designates the body or main portion of a tube entering into the construction of my improved tire, which tube may be composed of cellular or sponge rubber or other similar material, and which may be formed, as shown, so that it may be thicker on the outer line or circumference, as at $b$, which line constitutes the tread, and thinner on the inner line, as at $c$, on which line the tire may rest on the rim of the wheel, or it may be made in any other known or suitable form.

$d$ designates the sheath or casing for the tire, which may consist of a suitable fabric, which may surround or partially surround the tube $a$ and serve as a means for holding the tire on the rim $e$ of the wheel, as is clearly shown in Fig. 2. The casing $d$ and the manner of holding the tire upon the wheel do not, however, enter into my invention as the essence thereof.

$f$ designates a core for the tube $a$, which in this case may be supposed to consist of granular cork or other suitable light substance containing air interstices or spaces between the particles composing its body throughout. When composed of granular cork, the material may be tamped into the hollow of the tube and made as solid or compact as the requirements may warrant.

The tube $a$, as before stated, will be of air-tight character and be provided with a valved nipple $g$, of suitable structure, through which air may be pumped or forced into the tube into the interstices or spaces between the particles composing the core, so as to inflate and harden the body or tube $a$ to a degree additional to that created by the granular core $f$. A single valved nipple may be provided for each tire, or there may be two or more at different points around the circumference of the wheel.

The granular core $f$ will be sufficiently solid to permit the tire to subserve its ordinary functions on a wheel, but perhaps not so firm as to give the best results without the addition of air inflation, as before mentioned. When, however, compressed air is added to the granular matter composing the core, all of the advantages of a purely pneumatic tire are secured.

The object of this construction is to provide a tire which shall to all intents and purposes be a pneumatic tire, but which in case of accidental puncture may become a cushioned tire and still subserve its purposes sufficiently well to obviate "shipwreck," so called, and allow the rider of a wheel in case of mishap to reach home without difficulty.

The granular cork provides a light substance and one replete with air-interstices, though, as before stated, other suitable material may be employed.

By making the body of the tube of cellular rubber or similar material and insheathing it as described, when it is inflated with air the body may be solidified to any desired degree by compression from within.

Having thus explained the nature of the invention and described a way of constructing and using the same, though without attempting to set forth all of the forms in which it may be made or all of the modes of its use, it is declared that what is claimed is—

1. A tire for vehicle-wheels consisting of an air-tight tube composed of sponge or cellular rubber provided with a core consisting of granular cork having communicating interstices or air-spaces between its particles, a substantially inelastic inclosing sheath expansively restricted, and a valved nipple affording communication with the interior of the tube, whereby the tube may be inflated and the cellular-rubber body constricted within its normal bounds.

2. A tire for vehicle-wheels consisting of an air-tight tube composed of cellular rubber provided with a light core of different substance, having communicating interstices or air-spaces between its component particles, a substantially inelastic inclosing sheath expansively restricted, and a valved nipple affording communication with the interior of the tube, whereby the tube may be inflated and the cellular-rubber body constricted within its normal bounds.

In testimony whereof I have signed my name to this specification, in the presence of two subscribing witnesses, this 20th day of July, A. D. 1895.

CHARLES A. PRATT.

Witnesses:
ARTHUR W. CROSSLEY,
MARCUS B. MAY.